(12) United States Patent
Mawkin et al.

(10) Patent No.: US 12,182,566 B1
(45) Date of Patent: Dec. 31, 2024

(54) AUTOMATED SOFTWARE CONTAINER REHYDRATION AND DEPLOYMENT

(71) Applicant: FMR LLC, Boston, MA (US)

(72) Inventors: Amit Mawkin, Frisco, TX (US); Peter Davies, Christiansburg, VA (US); Sancho Chittillappily Sebastine, Coppell, TX (US); Aravind Arumugham, Tamil Nadu (IN); Dilip Kumar Raghupatruni, Durham, NC (US); Robert Rosum, Shrewsbury, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/758,418

(22) Filed: Jun. 28, 2024

(51) Int. Cl.
*G06F 8/65* (2018.01)

(52) U.S. Cl.
CPC ...................... *G06F 8/65* (2013.01)

(58) Field of Classification Search
USPC .......................................................... 717/168
See application file for complete search history.

(56) References Cited

U.S. PATENT DOCUMENTS

| | | | |
|---|---|---|---|
| 10,379,841 B2 | 8/2019 | Wong et al. | |
| 10,810,003 B2 | 10/2020 | Gainsborough et al. | |
| 10,911,540 B1 | 2/2021 | Gunasekaran et al. | |
| 2011/0029963 A1* | 2/2011 | Smith | H04L 67/34 709/224 |
| 2016/0173573 A1* | 6/2016 | Chan | H04L 67/10 709/226 |
| 2018/0011699 A1* | 1/2018 | Manthiramoorthy | G06F 9/455 |
| 2020/0379746 A1* | 12/2020 | Shivashankara | G06F 21/45 |
| 2021/0303294 A1* | 9/2021 | Jozsa | G06F 9/455 |
| 2021/0312037 A1* | 10/2021 | Revivo | G06F 21/577 |
| 2023/0029624 A1* | 2/2023 | Olejarz | G06F 8/77 |

\* cited by examiner

*Primary Examiner* — Qing Chen
*Assistant Examiner* — Clint Thatcher
(74) *Attorney, Agent, or Firm* — Cesari and McKenna, LLP

(57) ABSTRACT

Methods and apparatuses for automated software container rehydration and deployment include a server that updates a container image for a software application by modifying layers of the container image and deploying the updated container image as a first container in a passive production environment. For a plurality of traffic volumes, the server: a) increases application traffic directed to the first container to a first traffic volume, b) monitors service level indicators associated with performance of the first container, c) increases the application traffic directed to the first container to a higher traffic volume upon determining that the service level indicators are within a performance threshold, and d) repeats steps b) and c) until the application traffic is increased to a highest traffic volume and the service level indicators are within the performance threshold. The server deploys the updated container image as a second container in an active production environment.

30 Claims, 7 Drawing Sheets

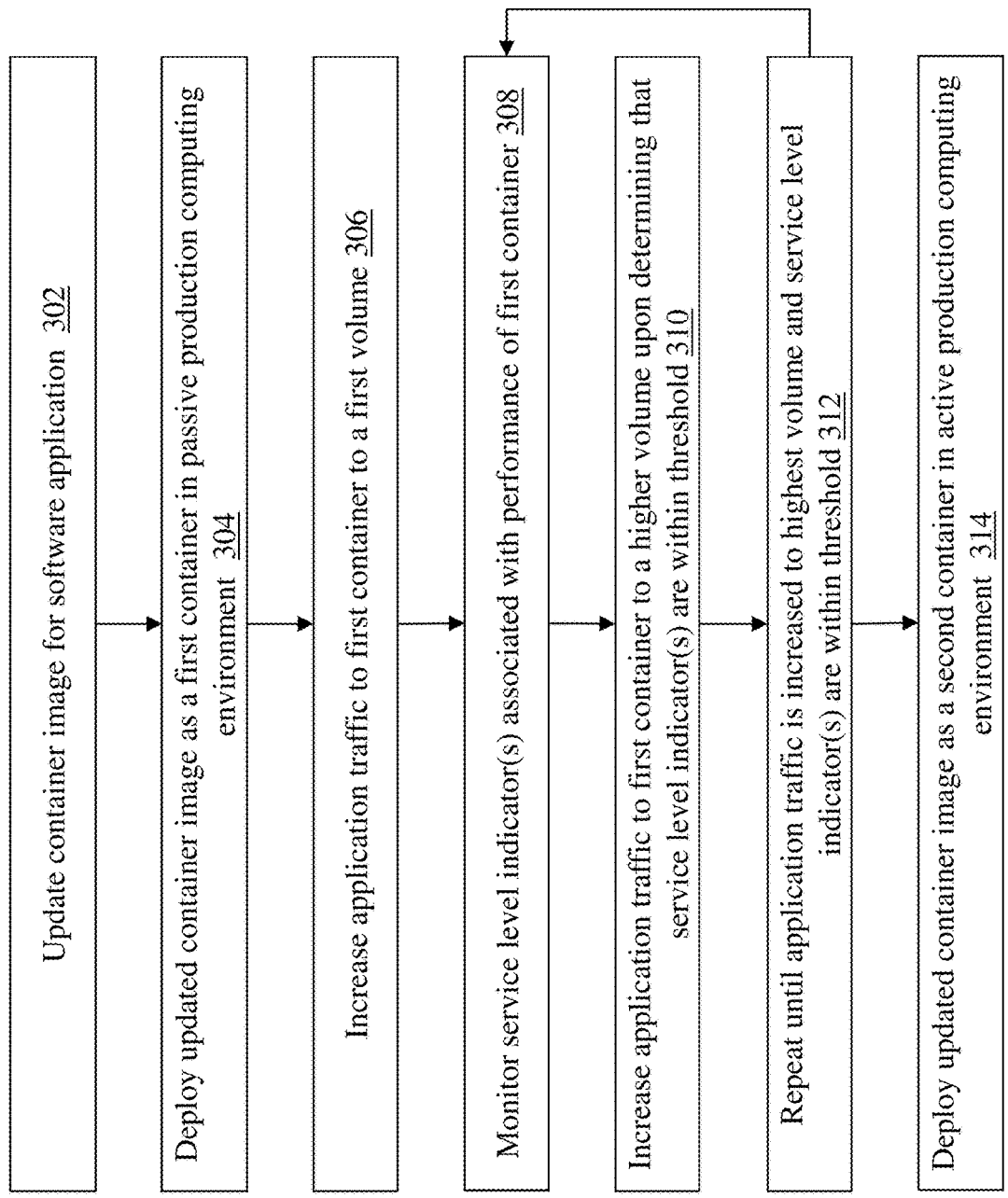

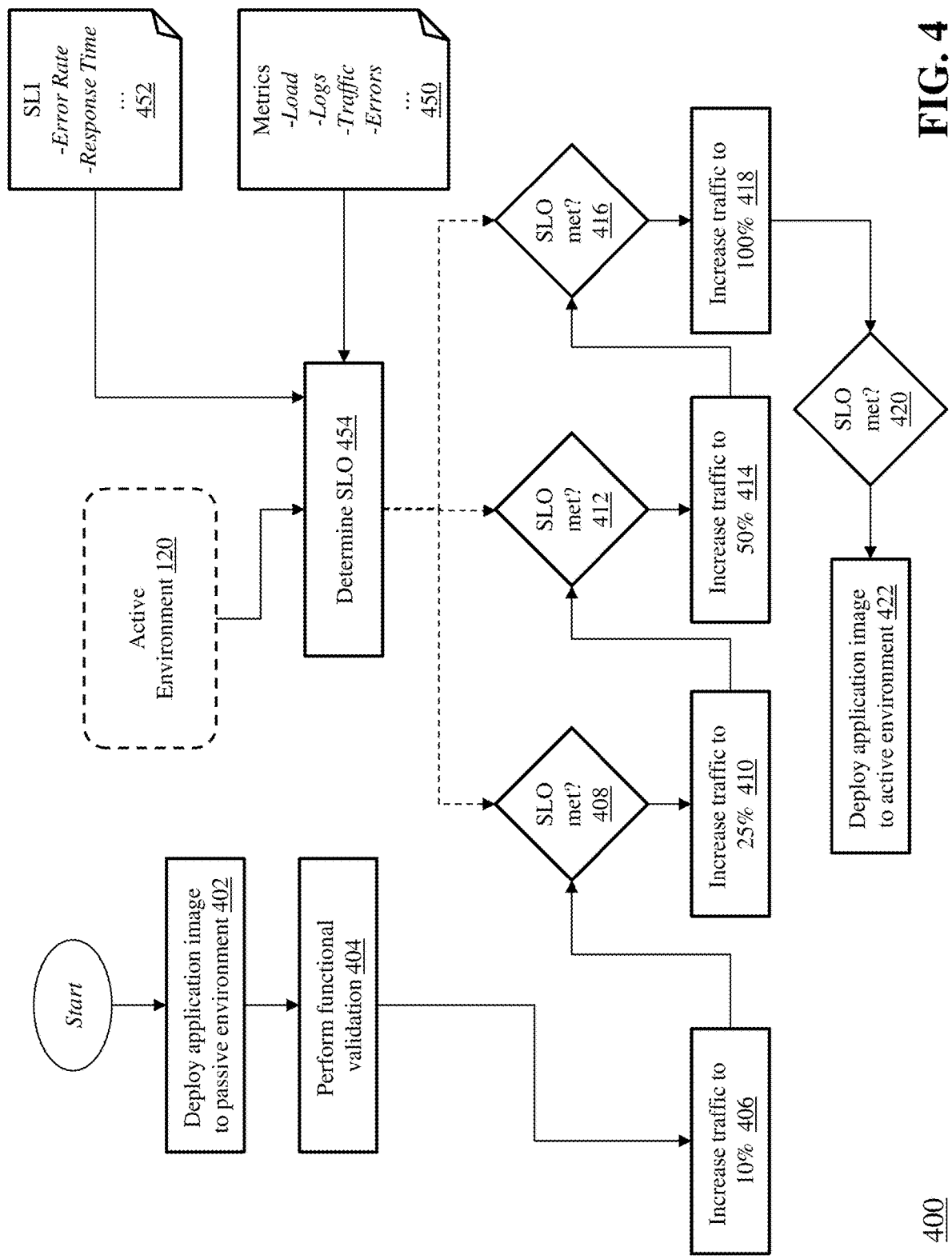

FIG. 5

| App Name | Next Rehydration Due Date | Current Production Artifact | Security Rating | External Facing |
|---|---|---|---|---|
| sample application | 4/27/2024 | v1.5 | medium | No |
| AP133704 | | | | 502 |

☑ Automated Rehydration Enabled
⊘ Rehydration Compliant

4/4 Prerequisite(s) Passed | ⊘ Prereq 1 | ⊘ Prereq 2 | ⊘ Prereq 3 | ⊘ Prereq 4 _504_

Automated Rehydration Settings

[Edit Settings] ← 508

| Error Rate (%) | Response Time (ms) | Non Prod Env. | Non Prod Validation | Prod Validation |
|---|---|---|---|---|
| 3 | 12 | uat | Manual | Manual |

AUTOMATED SOFTWARE CONTAINER REHYDRATION AND DEPLOYMENT

TECHNICAL FIELD

This application relates generally to methods and apparatuses, including computer program products, for automated software container rehydration and deployment in a distributed computing environment.

BACKGROUND

Software containers have emerged as an efficient and scalable way to deliver packaged software application code for execution in an isolated environment—also known as operating system virtualization. Typically, a software container is deployed for execution as an independent process running on a server infrastructure (e.g., cloud environment). Each software container is commonly composed of a multi-layered application image which includes software elements such as code, runtime, system tools, settings, libraries, and the like that enable execution of the underlying application. Application images usually comprise a base layer which contains elements such as operating system (OS) packages, security packages, and other elements of the runtime environment for the application. Application images also comprise one or more application layers that represent a change or addition to the image, i.e., application packages that are integrated into the image. Examples of currently-available software container projects include Docker™, Open Container Initiative (OCI), and Amazon™ EC2 Containers.

Generally, the source code and packages underlying the application layers in a software container are not updated as frequently as the packages in the base layer. For example, an operating system or security software in the base layer may receive updates and patches every few days, while the code in the application layer(s) may only be updated every quarter. As such, the base layer of application images needs to be updated to incorporate the most recent software updates, which results in the need to rehydrate the corresponding containers in production once the application image is updated. As can be appreciated, this process currently requires multiple teams (e.g., development, QA, live ops) to build a new application image, perform validation testing on the new image, plan for installation of the image as a container, install the image into a container, perform functional validation of the container, and then release the container into a live production environment. Because this activity is performed so frequently, it places a significant burden on the system administration personnel to carry out this deployment pipeline.

In addition, errors and performance issues introduced via changes to existing application images may only be detected once the container is rolled out to the active production environment—thus impacting a large number of end users. In these situations, the container must be taken offline and analyzed to determine what is causing the issues, then modified and re-installed in the production environment. This delay results in degraded performance of the application and end user dissatisfaction. Furthermore, in these systems there is a possibility of unintended changes in the current code base getting into a production environment. Additional testing must be performed to ensure that the application behaves as expected.

SUMMARY

Therefore, what is needed are methods and systems for dynamically rehydrating production containers with updated application images and automatically deploying the containers. The techniques described herein advantageously utilize a process of incrementally increasing traffic volume to newly-deployed containers and monitoring the performance of application software in the containers using defined performance thresholds as traffic is increased. Beneficially, the systems and methods described herein can determine normal trends for application metrics and performance thresholds in order to determine service level indicators of acceptable vs. unacceptable performance. In some embodiments, the performance thresholds are not fixed, rather, they are continually generated and adjusted based upon performance input from the production environment.

Other advantages provided by the methods and systems described herein include:
- The automatic calculation of a checksum (e.g., MD5 checksum) of code artifacts inside a container image to confirm that the correct code is being deployed;
- Automated testing integration to run tests against updated container images in order to validate functionality;
- Any pre-requisite tasks required for a change to the production environment are taken care of by the overall process, e.g., checking for necessary organization and regulatory attributes, running security scans, etc.;
- Generating notifications in the form of, e.g., automated emails and/or instant messages at each phase of the process;
- Detecting availability of newer base images and automatic application of those images; and
- Ensuring installation restrictions are followed in the production environment, and performing such installation during valid windows.

The invention, in one aspect, features a system for automated software container rehydration and deployment. The system includes a server computing device having a memory for storing computer-executable instructions and a processor that executes the computer-executable instructions. The server computing device updates a container image for a software application by modifying one or more layers of the container image. The server computing device deploys the updated container image as a first container in a passive production computing environment. For a plurality of traffic volumes, the server computing device: a) increases application traffic directed to the first container to a first traffic volume, b) monitors one or more service level indicators associated with performance of the first container, c) increases the application traffic directed to the first container to a higher traffic volume upon determining that the service level indicators are within a performance target threshold, and d) repeats steps b) and c) until the application traffic is increased to a highest traffic volume and the service level indicators are within the performance target threshold. The server computing device deploys the updated container image as a second container in an active production computing environment that is coupled to the passive production computing environment.

The invention, in another aspect, features a computerized method of automated software container rehydration and deployment. A server computing device updates a container image for a software application by modifying one or more layers of the container image. The server computing device deploys the updated container image as a first container in a passive production computing environment. For a plurality of traffic volumes, the server computing device: a) increases application traffic directed to the first container to a first traffic volume, b) monitors one or more service level indicators associated with performance of the first container, c)

increases the application traffic directed to the first container to a higher traffic volume upon determining that the service level indicators are within a performance target threshold, and d) repeats steps b) and c) until the application traffic is increased to a highest traffic volume and the service level indicators are within the performance target threshold. The server computing device deploys the updated container image as a second container in an active production computing environment that is coupled to the passive production computing environment.

Any of the above aspects can include one or more of the following features. In some embodiments, updating the container image for the software application comprises modifying a base layer of the container image. In some embodiments, modifying the base layer of the container image comprises replacing one or more software packages in the base layer with newer versions of the software packages.

In some embodiments, increasing application traffic directed to the first container to a first traffic volume comprises redirecting application traffic intended for a container in the active production computing environment to the first container according to the first traffic volume. In some embodiments, the first traffic volume is less than or equal to 10% of the application traffic directed to the container in the active production computing environment. In some embodiments, higher traffic volumes than the first traffic volume include: i) between 10% and 24% of the application traffic directed to the container in the active production computing environment, and ii) between 25% and 49% of the application traffic directed to the container in the active production computing environment. In some embodiments, the highest traffic volume is between 50% and 100% of the application traffic directed to the container in the active production computing environment.

In some embodiments, the one or more service level indicators associated with performance of the first container comprise load metrics, log metrics, traffic metrics, and error metrics. In some embodiments, determining that the service level indicators are within a performance target threshold comprises comparing each of the service level indicators to a corresponding value in the performance target threshold. In some embodiments, the performance target threshold values are determined from performance of a container for the software application in the active production computing environment. In some embodiments, the server computing device periodically analyzes the performance of the container for the software application in the active production computing environment and updates the performance target threshold values based upon the periodic analysis. In some embodiments, deploying the updated container image as the second container in the active production computing environment comprises deactivating the container for the software application in the active production computing environment and activating a new container with the updated container image as the second container.

In some embodiments, the server computing device executes one or more functional validation tests on the first container upon deploying the first container in the passive production computing environment. In some embodiments, the server computing device decreases the application traffic directed to the first container to a lower traffic volume upon determining that the service level indicators are not within the performance target threshold. In some embodiments, the server computing device transmits a notification message to a remote computing device upon determining that the service level indicators are not within the performance target threshold Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of automated software container rehydration and deployment in a distributed computing environment.

FIG. 4 is a flowchart of a computerized method for incrementally increasing production traffic to a deployed container in passive production environment.

FIG. 5 is a diagram of an exemplary user interface for initiating a container image rehydration process.

FIG. 6 is a diagram of an exemplary user interface for monitoring completion of a container image rehydration process.

DETAILED DESCRIPTION

Figure 1:
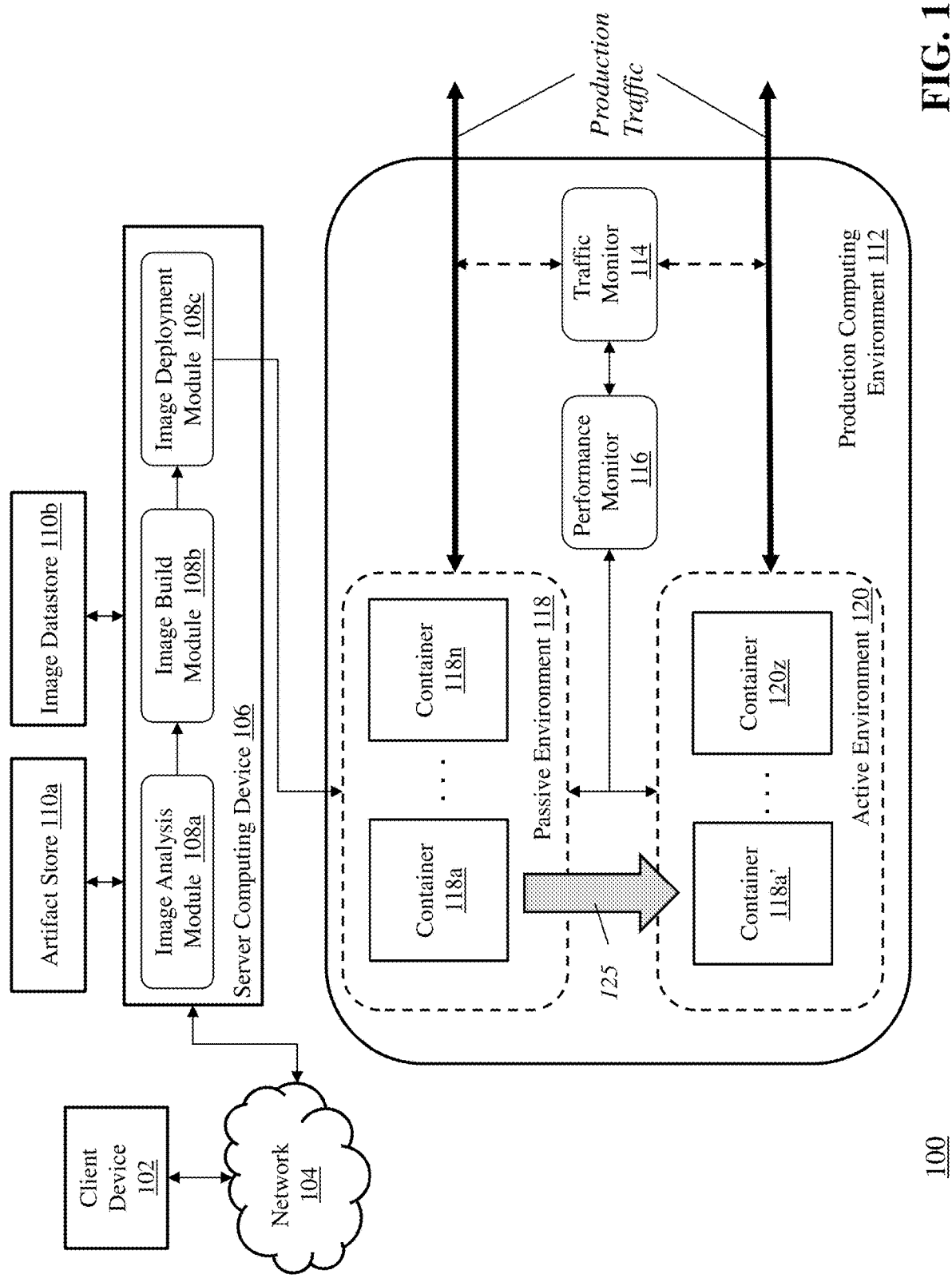
FIG. 1 is a block diagram of a system for automated software container rehydration and deployment in a distributed computing environment.

FIG. 1 a block diagram of system 100 for automated software container rehydration and deployment in a distributed computing environment. System 100 includes a client computing device 102 that is coupled via communications network 104 to server computing device 106. Server computing device 106 includes image analysis module 108*a*, image build module 108*b*, and image deployment module 108*c*. Server computing device 106 is coupled to artifact store 110*a* and image datastore 110*b*. System 100 also includes production computing environment 112, which comprises traffic monitor 114, performance monitor 116, passive production environment 118 with containers 118*a*-118*n*, and active production environment 120 with containers 118*a*'-120*z*.

Client computing device 102 connects to communications network 104 in order to communicate with server computing device 106 to provide input and receive output relating to the process of automated software container rehydration and deployment as described herein. In some embodiments, client computing device 102 is coupled to a display device (not shown). For example, client computing device 102 can provide a detailed graphical user interface (GUI) via the display device that presents output resulting from the methods and systems described herein, where the GUI is utilized by an operator to review data associated with the process of automated software container rehydration and deployment in a distributed computing environment.

Exemplary client computing devices 102 include, but are not limited to, desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communication network 104 enables the other components of system 100 to communicate with each other in order to perform the process of automated software container rehydration and deployment in a distributed computing environment as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of system 100 to communicate with each other.

Server computing device 106 is a combination of hardware, including one or more special-purpose processors and one or more physical memory modules, and specialized software modules-such as image analysis module 108a, image build module 108b, and image deployment module 108c—that execute on one or more processors of server computing device 106, to receive data from other components of system 100, transmit data to other components of system 100, and perform functions for automated software container rehydration and deployment in a distributed computing environment as described herein. In some embodiments, modules 108a-108c are specialized sets of computer software instructions programmed onto one or more dedicated processors in server computing device 106 and can include specifically-designated memory locations and/or registers for executing the specialized computer software instructions. Additional explanation of the specific processing performed by modules 108a-108c will be provided below.

Artifact store 110a and image datastore 110b comprise transient and/or persistent memory for data storage, that is used in conjunction with the process of automated software container rehydration and deployment in a distributed computing environment as described herein. Generally, artifact store 110b comprises software application images that can be deployed into containers in production computing environment 112 so that one or more remote computing devices can connect to the containers and access application functionality. Generally, image datastore 110a comprises software application code files, artifacts, libraries, configuration files, metadata, and other elements that make up one or more of the software applications contained in software application images. In some embodiments, all or a portion of artifact store 110a and/or image datastore 110b can be integrated within server computing device 106 or be located on a separate computing device or devices. In some embodiments, artifact store 110a and/or image datastore 110b are hosted on one or more remote computing devices (e.g., cloud-based architecture) that are accessible to server computing device 106.

Production computing environment 112 is a combination of hardware, including one or more computing devices comprised of special-purpose processors and one or more physical memory modules, and specialized software—such as traffic monitor 114, performance monitor 116, passive production environment 118 and active production environment 120—that are executed by processor(s) of the server computing devices in cloud computing environment 106, to receive requests for application functionality from remote computing devices, process the API requests, and provide responses to the application requests. In some embodiments, production computing environment 112 is a cloud-based computing platform. Exemplary cloud computing platforms that can be used for production computing environment 112 include, but are not limited to, Amazon® Web Services (AWS); IBM® Cloud™; and Microsoft® Azure™. It should be appreciated that other types of computing resource distribution and configuration in a production computing environment can be used within the scope of the technology described herein.

Traffic monitor 114 and performance monitor 116 are computer software modules that execute in production computing environment 112 to perform specifically designated functions as part of the process of automated software container rehydration and deployment in a distributed computing environment as described herein. In some embodiments, traffic monitor 114 acts as a load balancer to monitor and adjust a volume of production traffic (i.e., requests from remote computing devices for application functionality made available via software containers, as well as responses to the requests) directed to each of the passive environment 118 and the active environment 120). In some embodiments, traffic monitor 114 is initially configured to direct all incoming application requests to containers in the active production environment 120, while the containers in passive production environment 120 do not receive any incoming application requests. As a result of this configuration, active production environment 120 handles 100% of the traffic load while passive production environment 118 handles 0% of the traffic load. In some embodiments, traffic monitor 114 can be configured to adjust the volume of production traffic on a container-by-container basis in each of the passive production environment 118 and the active production environment 120. For example, traffic monitor 114 can direct a defined volume (e.g., 20%) of incoming application requests to container 118a in passive production environment 118, and monitor 114 can direct a different defined volume (e.g., 50%) to container 120z in active production environment 120.

In some embodiments, performance monitor 116 is coupled to one or more of the containers in each of the passive production environment 118 and the active production environment 120, in order to capture application metrics associated with performance of the containers and use the metric to identify service level indicators (SLI) for the corresponding container. In some embodiments, performance monitor 116 is configured to capture load metrics, log metrics, traffic metrics, and/or error metrics generated by each container and determine whether the container's performance is meeting certain defined SLI thresholds. For example, performance monitor 116 can analyze the application metrics and determine that a given container (e.g., container 118n) has generated a large number of errors during execution of the associated application functionality—where the number of errors generated exceeds a defined tolerance threshold. In this scenario, performance monitor 116 can provide the information to traffic monitor 114 which can adjust the volume of production traffic directed to container 118n to reduce the number of errors being generated.

Figure 2:
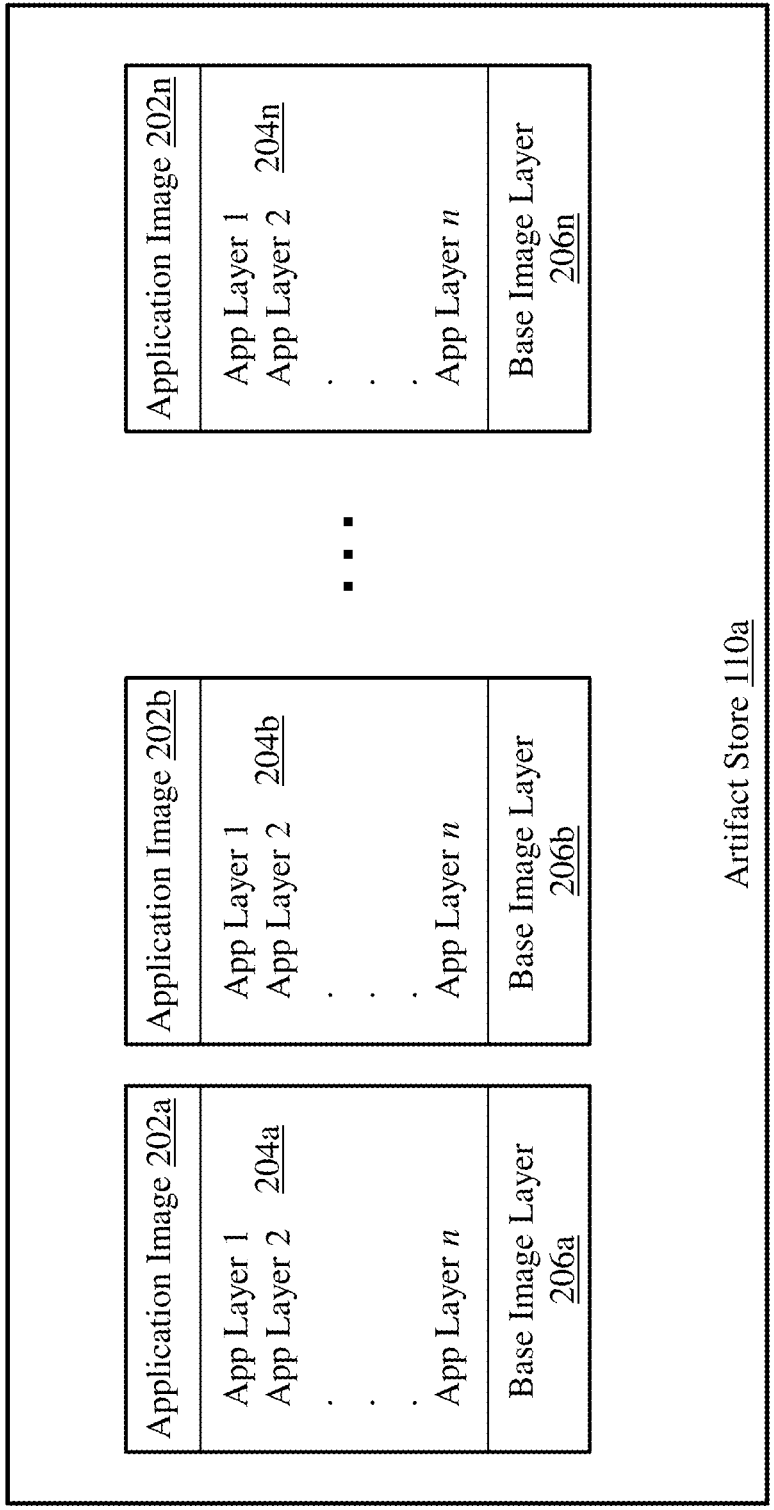
FIG. 2 is a diagram of exemplary software application images.

Generally, containers 118a-118n and 118a'-120z each comprise an instance of a multilayered software image (i.e., software code files, environment variables, operating system, libraries, other dependencies, and the like) deployed for execution in a production computing environment (e.g., 112). Software images are stored in artifact storage 110a and retrieved by server computing device 106 when instances of the images need to be created in production computing environment 112. In some embodiments, software images are created in a layered format (as described in the Image Specification of the Open Container Initiative (OCI), available at github.com/opencontainers/image-spec), where each layer carries certain application-related artifacts in the image bundle. FIG. 2 is a diagram of exemplary software application images 202a-202n stored in artifact store 110a. As shown in FIG. 2, each software application image 202a-202n comprises a plurality of app layers 204a, 204b and 204n and each layer contains application artifacts needed to run the application in production environment 112. Each image also contains a base image layer 206a, 206b, 206n which contains artifacts such as operating system (OS) packages, latest security packages, and the like.

In some embodiments, containers can be replicated across the passive computing environment 118 and the active computing environment 120. For example, container 118n and container 120z can be instances of the same software application image that are deployed to the respective environments 118, 120. In another example, container 118n can be an instance of a first software application image, while container 120z can be an instance of a second software application image that comprises one or more artifacts and/or layers that are different than artifacts and/or layers in the first image (e.g., different operating system versions, different application versions, different software patches applied, etc.).

FIG. 3 is a flow diagram of a computerized method 300 of automated software container rehydration and deployment in a distributed computing environment, using system 100 of FIG. 1. As can be appreciated, over time software application images generally require updates to the application artifacts, such as updating the image to include the latest OS patches or new security patches. For the large majority of updates, the source code that makes up the application layer(s) of the image remain unchanged. Therefore, it is optimal to update only the base layer of the software application images and rehydrate the corresponding containers in the production computing environment-instead of having to rebuild the entire image. These updates are carried out by modifying or replacing the base layer containing the changed packages—which results in a new image (with the updated packages) stored in the artifact store 110a. In some embodiments, the updating activity occurs periodically, e.g., every x number of days.

Image analysis module 108a of server computing device 106 updates (step 302) a container image (e.g., application image 202a in FIG. 2) for a given software application. In some embodiments, image analysis module 108a periodically scans artifact store 110a to identify one or more software application images that require updates. For example, image analysis module 108a can determine that the base layer of a particular application image includes an out-of-date version of the operating system (e.g., by comparing the version number in the base layer and/or in metadata associated with the application image to a known current version number). In another example, module 108a can determine that the base layer does not include one or more recent security patches (e.g., by determining that the application image and/or base layer was created on a particular date, and the security patches were released on a more recent date). It should be appreciated that other techniques for determining that an application image requires one or more updates can be utilized. Image analysis module 108a can retrieve the identified container images from artifact store 110a (and/or generate a list of identified container images) and provide the images/list to image build module 108b. In some embodiments, image analysis module 108a can store the identified container images in image datastore 110b during the update process.

Image build module 108b receives the images and/or list from module 108a and uses the build images to extract application code components (e.g., current production application code components) from image datastore 110b. Module 108b then uses the extracted application code components to build a new production container image that comprises the new base layer and existing application code components. In some embodiments, image build module 108b generates a new build of the base layer for the application image using one or more application components (such as software packages) that comprise the updates as retrieved from external sources that publish the base layer updates. Module 108b stores the updated build in artifact store 110a. For example, module 108b can generate a new base layer using the updated components, replace the existing base layer in the application image with the new base layer, and re-build the application image. As can be appreciated, the base container layer is updated without any updates or changes to the corresponding application code layer(s). In some embodiments, module 108b can perform a hash check (e.g., MD5 hash) of the application code components and/or image in the old container image to the same components in the new container image to ensure that the components are the same. For example, module 108b generates an MD5 hash value based upon a particular artifact in the old container image and compares that value to an MD5 hash value based upon the same artifact (e.g., artifact name, version, etc.) in the new container image. If the two MD5 values match, then module 108b confirms that the components are the same (i.e., have not been modified or changed).

Image deployment module 108c then deploys (step 304) the updated application image as a first container (e.g., container 118a) in passive production environment 118. As can be appreciated, because the application image has been updated, there may be unforeseen technical issues that arise when the application image is deployed as a container in a production environment. For example, one or more of the updated software packages in the base layer trigger application errors when deployed to production that result in degraded performance of the application. To avoid having such technical issues impact active production environment 120 where end users are actively interacting with containers 118a'-120z, image deployment module 108c deploys the updated application image to passive environment 118 as container 118a where the container is initially configured as not receiving any end user production traffic (as described above). This configuration enables the system administrator to, e.g., perform validation testing on container 118a to ensure that the application image is functional and operating normally. In addition, traffic monitor 114 can gradually increase the volume of production traffic that is routed to container 118a as a second level of validation. For example, performance monitor 116 analyzes a plurality of application metrics corresponding to the operation of container 118a as traffic is increased, and identifies whether the metrics meet defined service level indicator (SLI) thresholds. When the metrics are within the bounds of the SLI thresholds, traffic monitor 114 can increase the volume of traffic to container 118a to the next highest level and repeat the performance evaluation until container 118a is receiving a maximum level of application traffic. As can be appreciated, this methodology has the advantage of providing for an automated rollout of new application images to the production environment while minimizing the impact of technical issues on end users. Additional detail regarding the incremental increase of traffic volume to containers and corresponding performance evaluation is described below with reference to FIG. 4.

Continuing with FIG. 3, traffic monitor 114 then increases (step 306) application traffic directed to container 118a to a first traffic volume. As described above, container 118a receives no production traffic when the container is initially deployed to passive environment 118. After completion of the function validation tests, traffic monitor 114 is configured to route a first defined volume of traffic to container 118a. For example, traffic monitor 114 can identify a portion of incoming production traffic that is directed to, e.g., a container in active production environment 112, where the container comprises an instance of an old application image which container 118a is intended to replace. Traffic monitor 114 can route this portion of incoming traffic to container 118a in passive environment 118.

Concurrently, performance monitor 116 monitors (step 308) one or more service level indicators associated with performance of container 118a. In some embodiments, performance monitor 116 connects to passive environment 118 and/or container 118a, and captures data associated with performance of container 118a. In some embodiments, performance monitor 116 is configured to capture data for a predetermined period of time (e.g., five minutes, one hour, one day, etc.). Performance monitor 116 determines one or more application metrics (e.g., load metrics, log metrics, traffic metrics, error metrics, response time) for container 118a from the captured data, and compares the application metrics to one or more service level indicator thresholds. For example, performance monitor 116 can determine that less than 5% of the application requests received by container 118a have resulted in errors during the time period and the service level indicator threshold for error metrics is 10%. As a result, performance monitor 116 determines that the service level indicator is within the defined performance target threshold. It should be appreciated that in some embodiments, performance monitor 116 can monitor one or a plurality of service level indicators for a given traffic volume and/or type of application image, and then monitor a different one or plurality of service level indicators for another traffic volume and/or type of application image.

Upon determining that the SLI threshold(s) are met, performance monitor 116 instructs traffic monitor 114 to increase (step 310) application traffic directed to container 118a to a higher traffic volume. In some embodiments, traffic monitor 114 increases the traffic volume to container 118a to a second defined volume that is higher than the current traffic volume. The steps of monitoring service level indicator thresholds associated with performance of container 118a (step 310) and increasing application traffic to container 118a (step 312) are then repeated (step 314) by traffic monitor 114 and performance monitor 116 for one or more additional traffic volumes until a highest traffic volume is reached and the service level indicators are still within the defined performance target thresholds-confirming that the application image is successfully able to handle a full volume of production traffic without any loss in performance or availability.

Upon reaching this stage, performance monitor 116 instructs image deployment module 108c to deploy (step 316) the updated application image as a second container (i.e., container 118a') in active production environment 120 that is coupled to passive production environment 118. As shown in FIG. 3, arrow 125 is used to indicate the deployment of container 118a' in active environment 120 using the instance of the application image as deployed in container 118a in passive environment 118. In some embodiments, image deployment module 108c can replace an existing container in active environment 120—such as a container that comprises the old application image—with container 118a'. For example, image deployment module 108c can create a new container instance in active environment 120 and deploy the updated application image in the new container instance, then instruct traffic monitor 114 to route subsequent incoming traffic to the new container instance while also stopping incoming traffic from being routed to the old container instance. Then, module 108c can end the old container instance to free up resources in active environment 120.

FIG. 4 is a flowchart of a computerized method 400 for incrementally increasing production traffic to a deployed container 118a in passive production environment 118, using system 100 of FIG. 1. As shown in step 402 of FIG. 4, an application image is deployed as a first container 118a to passive production environment 118. At step 404, one or more functional validation tests are performed to confirm that the application image in container 118a has been deployed successfully and is able to function in passive environment 118.

At step 406, traffic monitor 114 increases the production traffic directed to container 118a to a first traffic volume—in this example, monitor 114 increases the volume from 0% to 10%. It should be appreciated that the traffic volume assigned to container 118a by traffic monitor 114 can vary according to one or more technical considerations, including but not limited to: a type of application image deployed to container 118a, a total volume of traffic currently being directed to passive production environment 118, and/or a load balancing target between passive and active environments.

At step 408, after allowing container 118a to process the traffic for a certain period of time, performance monitor 116 determines whether the service level indicators configured for container 118a and/or the corresponding application image are met, that is, whether performance of the application deployed in container 118a meets one or more performance target thresholds. As shown in FIG. 4, performance monitor 114 can generate or retrieve defined SLI thresholds 450 (e.g., optimal performance targets for active production environment 120). Monitor 114 can also connect to active production environment 120 to analyze performance of containers deployed therein according to one or more application metrics 452. Performance monitor 114 adjusts the defined SLI thresholds 450 using the current performance data from active environment 120 to generate a set of service level objectives (SLOs) 454 that are used to evaluate the performance of containers 118a-118n in passive production environment 118. It should be appreciated that in some embodiments, the process of generating SLOs 454 to be used in evaluating performance of containers in passive environment 118 occurs asynchronously from the actual performance evaluation, while in other embodiments system 110 can generate SLOs dynamically in real time—i.e., as performance of containers in active environment 120 adapts to live traffic conditions, system 100 can automatically adjust the target thresholds for the service level indicators and/or the configuration of metrics used to determine SLOs.

Upon determining that container 118a has met the corresponding service level indicators, at step 410 traffic monitor 114 increases the production traffic directed to container 118a from the existing volume to the next higher volume (i.e., from 10% to 25%). Performance monitor 116 repeats the process of determining whether the service level indicators are met for the given traffic volume (steps 412, 416) and incrementally increasing the traffic volume directed to container 118a (steps 414, 418)—from 25% to 50%, and then from 50% to 100%. Then, at step 422, image deployment module 108c deploys the application image to a container (i.e., container 118a') in active production environment 120 upon confirming (step 420) that container 118a has met the service level indicators when the traffic volume is increased to 100%. It should be appreciated that the above traffic volume percentages are merely exemplary, and that traffic monitor 114 can be configured to utilize other values and/or methods for setting the volume of traffic to be routed to container 118a.

In some embodiments, performance monitor 116 may determine that a particular container deployed to passive environment 118 may not meet the corresponding service level indicators due to, e.g., issues with the software updates applied to the application image base layer. In these cases, performance monitor 116 can instruct traffic monitor 114 to decrease the application traffic directed to the first container to a lower traffic volume upon determining that the service level indicators are not within the performance target threshold(s). For example, if container 118a is not meeting the service level indicators when receiving a traffic volume of 25%, traffic monitor 114 can decrease the traffic volume back down to 10% for a predetermined period of time. In some embodiments, traffic monitor 114 can decrease the traffic volume down to 0% so that any subsequent application requests are not directed to container 118a. Performance monitor 116 can transmit a notification message to a system administrator (e.g., via client computing device 102) which informs the administrator that there may be an issue with the application image deployed in container 118a and suggests reversion or re-building of the application image.

FIG. 5 is a diagram of an exemplary user interface 500 for initiating a container image rehydration process. In some embodiments, user interface 500 can be generated by server computing device 106 and displayed to a user of client computing device 102. As shown in FIG. 5, user interface 500 includes section 502 for scheduling rehydration of a particular application for example, a user at client device 102 can select an application to be rehydrated in a production computing environment 112 along with certain aspects of the rehydration process such as rehydration due date, security rating, whether the application is external facing, etc. In some embodiments, server computing device 106 automatically populates one or more of the fields in section 502 based upon information about the application as obtained from, e.g., artifact store 110a and/or image datastore 110b User interface 500 also includes section 504 that indicates to the user whether the application has met one or more prerequisites for rehydration. User interface 500 further includes section 506, which provides fields for displaying the automated rehydration settings—such as error rate (%), response time (ms), non production environment, non production validation type, and production validation type. Section 506 includes button 508 to enable the user to edit the rehydration settings.

Figure 6:
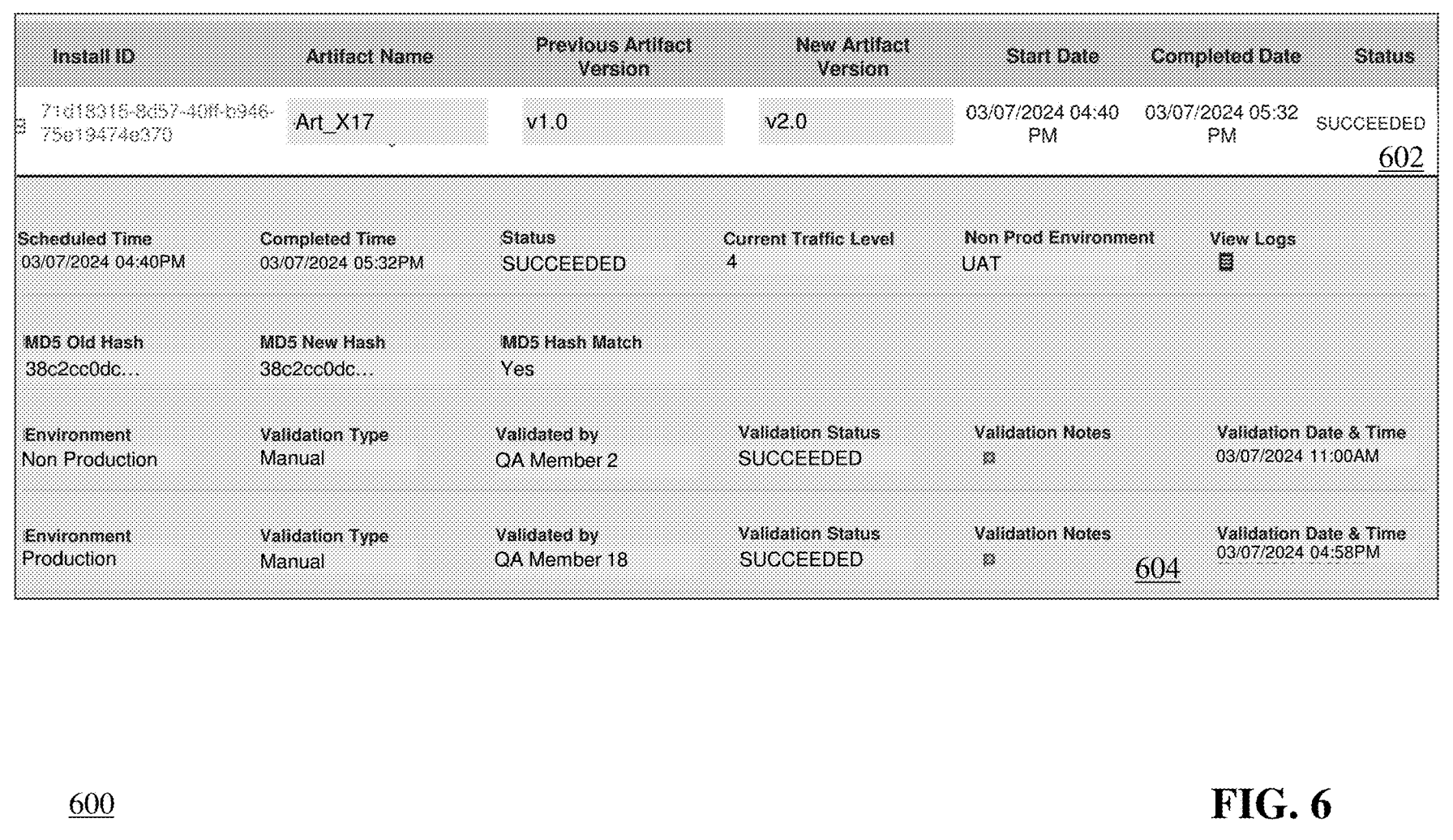

FIG. 6 is a diagram of an exemplary user interface 600 for monitoring completion of a container image rehydration process. In some embodiments, user interface 600 can be generated by server computing device 106 and displayed to a user of client computing device 102. As shown in FIG. 6, user interface 600 includes section 602 which provides a summary of rehydration completion status for a particular artifact-including artifact name, previous artifact version, new artifact version, start date, completion date, and status of rehydration (e.g., SUCCEEDED). The user at client computing device 102 can click on section 602 to expand the user interface to display section 604, which includes further details relating to the rehydration process.

Figure 7:
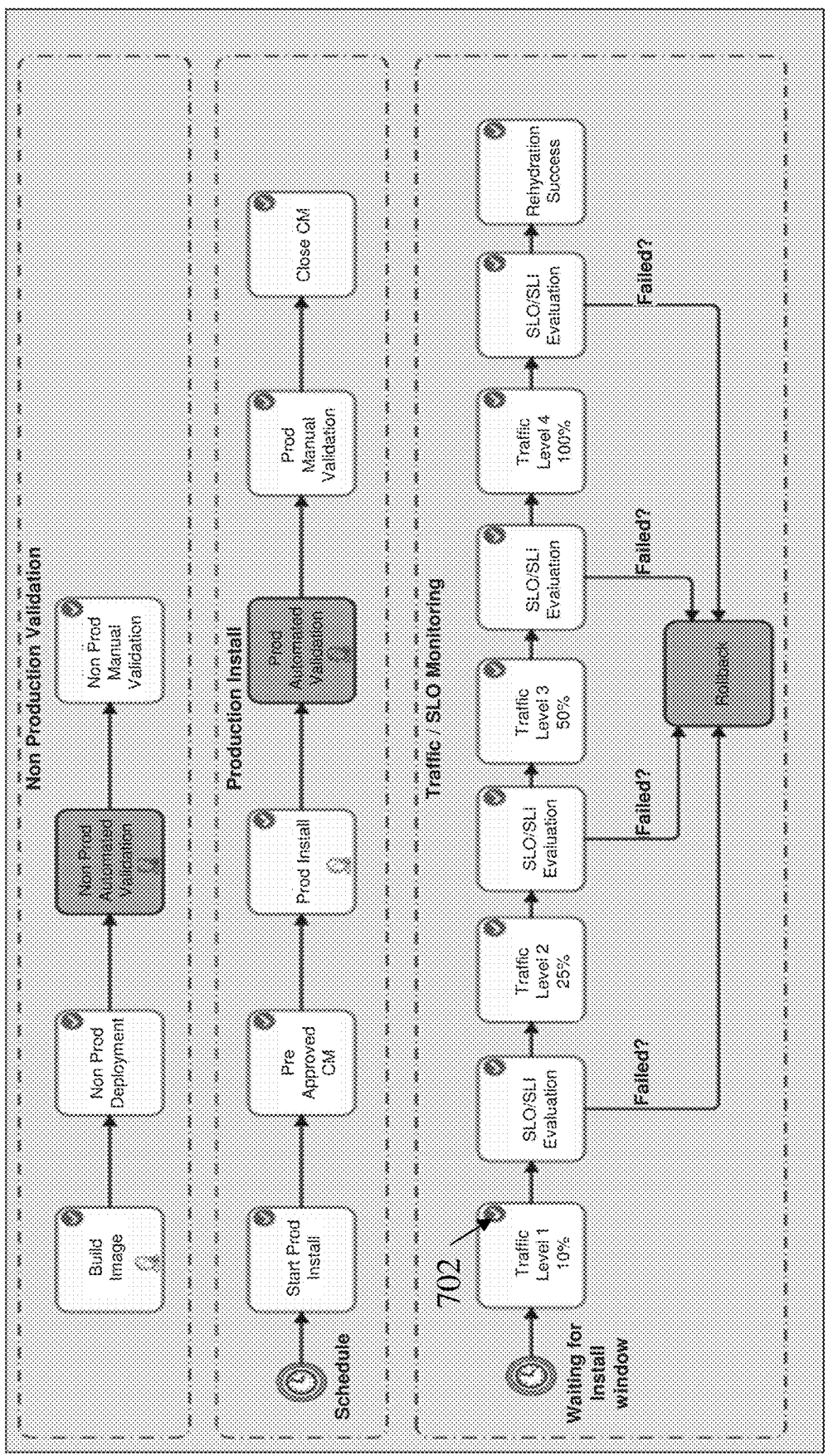
FIG. 7 is a diagram of an exemplary user interface for tracking deployment and validation of a container image, and traffic level/service level indicator evaluation.

FIG. 7 is a diagram of an exemplary user interface 700 for tracking deployment and validation of a container image, and traffic level/service level indicator evaluation. In some embodiments, user interface 700 can be generated by server computing device 106 and displayed to a user of client computing device 102. As shown in FIG. 7, user interface 700 includes a visual workflow of each phase of the rehydration process along with status indicators (e.g., 702) in each step—so that the user can quickly identify the progress of the deployment and SLO evaluation and determine where the process has experienced errors (if any).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application, and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated software container rehydration and deployment, the system comprising a server computing device having a memory for storing computer-executable instructions and a processor that executes the computer-executable instructions to:
   update a container image for a software application by modifying one or more layers of the container image;
   deploy the updated container image as a first container in a passive production computing environment;
   for a plurality of traffic volumes:
      a) increase application traffic directed to the first container to a first traffic volume,
      b) monitor one or more service level indicators associated with performance of the first container,
      c) increase the application traffic directed to the first container to a higher traffic volume upon determining that the service level indicators are within a performance target threshold, and
      d) repeat steps b) and c) until the application traffic is increased to a highest traffic volume and the service level indicators are within the performance target threshold; and
   deploy the updated container image as a second container in an active production computing environment that is coupled to the passive production computing environment.

2. The system of claim 1, wherein updating the container image for the software application comprises modifying a base layer of the container image.

3. The system of claim 2, wherein modifying the base layer of the container image comprises replacing one or more software packages in the base layer with newer versions of the software packages.

4. The system of claim 1, wherein increasing application traffic directed to the first container to a first traffic volume comprises redirecting application traffic intended for a container in the active production computing environment to the first container according to the first traffic volume.

5. The system of claim 4, wherein the first traffic volume is less than or equal to 10% of the application traffic directed to the container in the active production computing environment.

6. The system of claim 5, wherein higher traffic volumes than the first traffic volume include: i) between 10% and 25% of the application traffic directed to the container in the active production computing environment, and ii) between 25% and 50% of the application traffic directed to the container in the active production computing environment.

7. The system of claim 6, wherein the highest traffic volume is between 50% and 100% of the application traffic directed to the container in the active production computing environment.

8. The system of claim 1, wherein the one or more service level indicators associated with performance of the first container comprise load metrics, log metrics, traffic metrics, and error metrics.

9. The system of claim 8, wherein determining that the service level indicators are within a performance target threshold comprises comparing each of the service level indicators to a corresponding value in the performance target threshold.

10. The system of claim 9, wherein the performance target threshold values are determined from performance of a container for the software application in the active production computing environment.

11. The system of claim 9, wherein the server computing device periodically analyzes the performance of the container for the software application in the active production computing environment and updates the performance target threshold values based upon the periodic analysis.

12. The system of claim 10, wherein deploying the updated container image as the second container in the active production computing environment comprises deactivating the container for the software application in the active production computing environment and activating a new container with the updated container image as the second container.

13. The system of claim 1, wherein the server computing device executes one or more functional validation tests on the first container upon deploying the first container in the passive production computing environment.

14. The system of claim 1, wherein the server computing device decreases the application traffic directed to the first container to a lower traffic volume upon determining that the service level indicators are not within the performance target threshold.

15. The system of claim 14, wherein the server computing device transmits a notification message to a remote computing device upon determining that the service level indicators are not within the performance target threshold.

16. A computerized method of automated software container rehydration and deployment, the method comprising:
   updating, by a server computing device, a container image for a software application by modifying one or more layers of the container image;
   deploying, by the server computing device, the updated container image as a first container in a passive production computing environment;
   for a plurality of traffic volumes:
      a) increasing, by the server computing device, the application traffic directed to the first container to a first traffic volume,
      b) monitoring, by the server computing device, the one or more service level indicators associated with performance of the first container,
      c) increasing, by the server computing device, the application traffic directed to the first container to a higher traffic volume upon determining that the service level indicators are within a performance target threshold, and
      d) repeating, by the server computing device, steps b) and c) until the application traffic is increased to a highest traffic volume and the service level indicators are within the performance target threshold; and
   deploying, by the server computing device, the updated container image as a second container in an active production computing environment that is coupled to the passive production computing environment.

17. The method of claim 16, wherein updating the container image for the software application comprises modifying a base layer of the container image.

18. The method of claim 17, wherein modifying the base layer of the container image comprises replacing one or more software packages in the base layer with newer versions of the software packages.

19. The method of claim 16, wherein increasing application traffic directed to the first container to a first traffic volume comprises redirecting application traffic intended for a container in the active production computing environment to the first container according to the first traffic volume.

20. The method of claim 19, wherein the first traffic volume is less than or equal to 10% of the application traffic directed to the container in the active production computing environment.

21. The method of claim 20, wherein higher traffic volumes than the first traffic volume include: i) between 10% and 25% of the application traffic directed to the container in the active production computing environment, and ii) between 25% and 50% of the application traffic directed to the container in the active production computing environment.

22. The method of claim 21, wherein the highest traffic volume is between 50% and 100% of the application traffic directed to the container in the active production computing environment.

23. The method of claim 16, wherein the one or more service level indicators associated with performance of the first container comprise load metrics, log metrics, traffic metrics, and error metrics.

24. The method of claim 23, wherein determining that the service level indicators are within a performance target threshold comprises comparing each of the service level indicators to a corresponding value in the performance target threshold.

25. The method of claim 24, wherein the performance target threshold values are determined from performance of a container for the software application in the active production computing environment.

26. The method of claim 24, wherein the server computing device periodically analyzes the performance of the container for the software application in the active production computing environment and updates the performance target threshold values based upon the periodic analysis.

27. The method of claim 24, wherein deploying the updated container image as the second container in the active production computing environment comprises deactivating the container for the software application in the active production computing environment and activating a new container with the updated container image as the second container.

28. The method of claim 16, wherein the server computing device executes one or more functional validation tests on the first container upon deploying the first container in the passive production computing environment.

29. The method of claim 16, wherein the server computing device decreases the application traffic directed to the first container to a lower traffic volume upon determining that the service level indicators are not within the performance target threshold.

30. The method of claim 29, wherein the server computing device transmits a notification message to a remote computing device upon determining that the service level indicators are not within the performance target threshold.

* * * * *